(12) United States Patent
Farrugia et al.

(10) Patent No.: US 12,163,055 B2
(45) Date of Patent: Dec. 10, 2024

(54) PRINTED TEXTURED SURFACES WITH ANTIMICROBIAL PROPERTIES AND METHODS THEREOF

(71) Applicant: XEROX CORPORATION, Norwalk, CT (US)

(72) Inventors: Valerie M. Farrugia, Oakville (CA); Naveen Chopra, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 925 days.

(21) Appl. No.: 17/193,176

(22) Filed: Mar. 5, 2021

(65) Prior Publication Data

US 2022/0282096 A1 Sep. 8, 2022

(51) Int. Cl.

| | | |
|---|---|---|
| C09D 5/14 | (2006.01) | |
| B41F 16/00 | (2006.01) | |
| B41M 3/06 | (2006.01) | |
| B41M 5/00 | (2006.01) | |
| B41M 5/025 | (2006.01) | |
| B41M 7/00 | (2006.01) | |
| C08F 222/10 | (2006.01) | |
| C08J 3/24 | (2006.01) | |
| C08K 3/08 | (2006.01) | |
| C08K 5/00 | (2006.01) | |
| C08K 5/19 | (2006.01) | |
| C09D 11/03 | (2014.01) | |
| C09D 11/101 | (2014.01) | |
| C09D 11/104 | (2014.01) | |
| C09D 11/107 | (2014.01) | |
| C09D 11/12 | (2006.01) | |
| C09D 11/30 | (2014.01) | |
| C09D 11/34 | (2014.01) | |
| C09D 11/38 | (2014.01) | |
| C09D 135/02 | (2006.01) | |
| B82Y 30/00 | (2011.01) | |
| B82Y 40/00 | (2011.01) | |

(52) U.S. Cl.
CPC .............. *C09D 5/14* (2013.01); *B41F 16/00* (2013.01); *B41M 3/06* (2013.01); *B41M 5/0047* (2013.01); *B41M 5/025* (2013.01); *B41M 7/00* (2013.01); *C08J 3/24* (2013.01); *C08K 3/08* (2013.01); *C08K 5/0058* (2013.01); *C08K 5/19* (2013.01); *C09D 11/03* (2013.01); *C09D 11/101* (2013.01); *C09D 11/104* (2013.01); *C09D 11/107* (2013.01); *C09D 11/12* (2013.01); *C09D 11/30* (2013.01); *C09D 11/34* (2013.01); *C09D 11/38* (2013.01); *C09D 135/02* (2013.01); *B82Y 30/00* (2013.01); *B82Y 40/00* (2013.01); *C08F 222/102* (2020.02); *C08F 222/104* (2020.02); *C08K 2003/0806* (2013.01); *C08K 2201/011* (2013.01)

(58) Field of Classification Search
CPC ...... C09D 5/14; C09D 11/101; C09D 11/104; C09D 135/02; C09D 11/12; C09D 11/38; C09D 11/34; C09D 11/03; C09D 11/30; C09D 11/107; C08F 222/104; C08F 222/102; C08J 3/24; C08K 3/08; C08K 5/0058; C08K 5/19; C08K 2003/0806; C08K 2201/011; B41F 16/00; B41M 3/06; B41M 5/025; B41M 5/0047; B41M 7/00; B82Y 30/00; B82Y 40/00
See application file for complete search history.

(56) References Cited

U.S. PATENT DOCUMENTS

| | | |
|---|---|---|
| 7,276,614 B2 | 10/2007 | Toma et al. |
| 7,279,587 B2 | 10/2007 | Odell et al. |
| 7,531,582 B2 | 5/2009 | Toma et al. |
| 7,563,487 B2 | 7/2009 | Masuda et al. |
| 7,632,546 B2 | 12/2009 | Odell et al. |
| 7,650,848 B2 | 1/2010 | Brennan et al. |
| 8,334,026 B2 | 12/2012 | Chretien et al. |
| 8,603,612 B2 | 12/2013 | Chopra et al. |
| 8,669,298 B1 | 3/2014 | Vanbesien et al. |
| 9,012,527 B2 | 4/2015 | Chopra et al. |
| 9,617,437 B2 | 4/2017 | Farrugia et al. |

(Continued)

FOREIGN PATENT DOCUMENTS

| | | | | |
|---|---|---|---|---|
| WO | WO-2009076572 A2 | * | 6/2009 | ............ A61L 15/60 |
| WO | 2010135422 A1 | | 11/2010 | |

(Continued)

OTHER PUBLICATIONS

Watson et al., "A gecko skin micro/nano structure—A low adhesion, superhydrophobic, anti-wetting, self-cleaning, biocompatible, antibacterial surface," Acta Biomaterialia 21 (2015) 109-122.

(Continued)

*Primary Examiner* — Patrick D Niland

(74) *Attorney, Agent, or Firm* — MH2 Technology Law Group LLP

(57) ABSTRACT

An antimicrobial composition is disclosed. The antimicrobial coating composition includes at least one cured phase change ink which may include one or more crosslinked polymers, a photoinitiator, a wax, a gellant, and an antimicrobial additive. The composition also includes an engineered surface topography formed by the cured phase change ink. A method of preparing a textured antimicrobial surface is also disclosed. The method may include designing a template having a texture, printing the template onto a substrate using an uncured antimicrobial ink, and providing a light source to crosslink the uncured antimicrobial ink.

17 Claims, 3 Drawing Sheets

(56) References Cited

U.S. PATENT DOCUMENTS

| | | | |
|---|---|---|---|
| 9,840,626 | B2 | 12/2017 | Farrugia et al. |
| 10,570,290 | B2 | 2/2020 | Farrugia et al. |
| 2011/0074895 | A1* | 3/2011 | Chretien .............. C09D 11/101 |
| | | | 524/556 |
| 2012/0282448 | A1 | 11/2012 | Chretien et al. |
| 2013/0194366 | A1 | 8/2013 | Chretien et al. |
| 2013/0344232 | A1 | 12/2013 | Chopra et al. |
| 2016/0212989 | A1 | 7/2016 | Juodkazis et al. |
| 2017/0100332 | A1 | 4/2017 | Tonkin et al. |
| 2017/0275486 | A1 | 9/2017 | Chopra et al. |
| 2019/0233665 | A1 | 8/2019 | Chopra et al. |

FOREIGN PATENT DOCUMENTS

| | | | | |
|---|---|---|---|---|
| WO | 2012/058605 | A1 | 5/2012 | |
| WO | WO-2014202519 | A1 * | 12/2014 | ........... B41C 1/1016 |
| WO | 2015183719 | A1 | 12/2015 | |
| WO | 2018022590 | A1 | 2/2018 | |

OTHER PUBLICATIONS

Tripathy et al., "Natural and bioinspired nanostructured bactericidal surfaces," Advances in Colloid and Interface Science 248 (2017) 85-104.

Schumacher et al., "Engineered antifouling microtopographies-effect of feature size, geometry, and roughness on settlement of zoospores of the green alga Ulva," Biofouling, 2007; 23(1): 55-62.

Lee et al., "How microbes read the map: Effects of implant topography on bacterial adhesion and biofilm formation," Biomaterials 268 (2021) 120595.

Graham et al., "Nano and Microscale Topographies for the Prevention of Bacterial Surface Fouling," Coatings 2014, 4, 37-59; doi:10.3390/coatings4010037.

Whitehead et al., "Use of the atomic force microscope to determine the effect of substratum surface topography on the ease of bacterial removal," Colloids and Surfaces B: Biointerfaces 51 (2006) 44-53.

Wenzel, "Resistance of solid surfaces to wetting by water," Industrial and Engineering Chemistry, Aug. 1936, vol. 28, No. 8, 998-994.

Nowlin et al., "Adhesion-dependent rupturing of *Saccharomyces cerevisiae* on biological antimicrobial nanostructured surfaces," J. R. Soc. Interface 12: 20140999, Nov. 3, 2014.

Elbourne et al., "Nano-structured antimicrobial surfaces: From nature to synthetic analogues," Journal of Colloid and Interface Science 508 (2017) 603-616.

Elbourne et al., "Bacterial-nanostructure interactions: The role of cell elasticity and adhesion forces," Journal of Colloid and Interface Science 546 (2019) 192-210.

Mainwaring et al., "The nature of inherent bactericidal activity: insights from the nanotopology of three species of dragonfly," Nanoscale, 2016, 8, 6527.

Ivanova et al., "Bactericidal activity of black silicon," Nature Communications (2013) DOI: 10.1038/ncomms3838, 1-7.

Lam et al. "Combating multidrug-resistant Gram-negative bacteria with structurally nanoengineered antimicrobial peptide polymers," Nature Microbiology, vol. 1, Nov. 2016, 1-11.

Callow et al., "Trends in the development of environmentally friendly fouling-resistant marine coatings," Nature Communications (2011) DOI: 10.1038/ncomms1251, 1-10.

Invanova et al., "Natural Bactericidal Surfaces: Mechanical Rupture of Pseudomonas aeruginosa Cells by Cicada Wings," Small (2012) 8, No. 16, 2489-2494.

Bhushan, "Surface Roughness Analysis and Measurement Techniques," published 2001 by CRC Press LLC, 71 pages.

Requisition by the Examiner in Accordance with Subsection 86(2) of the Patent Rules, issued Mar. 3, 2023 in related Canadian Application No. 3,149,470, 4 pages.

Requisition by the Examiner in Accordance with Subsection 86(2) of the Patent Rules, issued Dec. 11, 2023 in related Canadian Application No. 3,149,470, 3 pages.

Extended European Search Report for corresponding European Application No. 22157365.2 dated Aug. 8, 2022, 8 pages.

* cited by examiner

PRINTED TEXTURED SURFACES WITH ANTIMICROBIAL PROPERTIES AND METHODS THEREOF

FIELD OF THE DISCLOSURE

This disclosure relates generally to printed antibacterial or antimicrobial coatings, and more specifically to textured printed antibacterial or antimicrobial coatings.

BACKGROUND

Bacteria and biofilm attachment to material surfaces are greatly influenced by the topography and roughness of the surfaces. Bacterial attachment to surfaces may be influenced by many factors such as hydrophobicity, van der Waals forces, electrostatic interactions and steric hindrance. Naturally occurring surfaces such as shark skin, lotus leaves and dragonfly wings all exhibit some type of bactericidal or antimicrobial properties depending on some of these factors. For example, dragonfly wings exhibit nano-scale pillar structures that inhibit the growth of some bacterial strains, while lotus leaves have both nano- and micro-scale hierarchical structures that encourage super-hydrophobic and self-cleaning properties. Shark-skin patterns have the appearance of diamond-like riblets which are perfectly designed for drag reduction and self-cleaning. Through the discovery and study of these naturally occurring surfaces and properties, many researchers are exploring biomimicry to help aid the inhibition of bacterial contamination on inanimate surfaces including high-touch surfaces such as doorknobs, bed or stair rails, touch screen monitors, cell phones, and the like. With the current rise in infections and widespread antibiotic resistance, new coatings for these high-touch surfaces, especially in healthcare-associated environments such as hospitals, medical clinics or dental offices is highly advantageous. There is also a continuing problem related to bacterial and fungal contamination through contact with surfaces and objects also within airplanes and cruise ships. Individuals suffering from gastroenteritis, for example, can easily spread the illness by touching handrails, shared utensils, elevator buttons, etc. In some cases, contamination can be deadly especially in the cases of outbreaks of gastroenteritis acquired on cruise ships caused by Noroviruses or food poisoning due to particular strains of *Escherichia coli* and *Salmonella*. Another bacterium, *Staphylococcus aureus*, is a major culprit for many illnesses and skin irritations. There is a type of *Staphylococcus aureus* that is Methicillin-resistant (known as MRSA) which is resistant to the antibiotic methicillin and other drugs in this class.

One example of an antimicrobial coating based on biomimicry can be found in commercial offerings that provide micropattern uniform widths with a diamond pattern that protrude and recess into the surface of the material to enhance antimicrobial properties. These microstructures are fabricated in silicon by using photolithography where a silicon wafer mold can be replicated with the hierarchical design and engineered roughness index. These patterned surfaces are repeated throughout the coating which is then attached to the surface. It has been noted that the use of some commercially available micropatterned surfaces resulted in Gram-negative bacteria (*Escherichia coli*) was reduced by up to 55% and the colony size by 76% compared with smooth films, after a 24-hour incubation period. This and other studies found that patterned surfaces, after a sufficient amount of time, will result in bacterial accumulation on the surface. Microtopography alone will not reduce fouling and bacterial accumulation.

Additional approaches to replicating naturally occurring surfaces include lithography methods such as electron beam, X-ray and nano-imprint lithography. As mentioned previously, lithography involves replicating surface patterns from a master and transferring it to another surface. Some of these lithography techniques can be time-consuming and costly when large-scale nano-structure fabrication is needed for sizeable area coverage such as walls and desks. Other fabrication methods can use vacuum casting which may be limited to micro-scale structures or femtosecond lasers which is a promising method used in orthopedic implants where micro and nano-structures surface patterns can be fabricated directly onto titanium substrates. Traditional coating techniques also require adhesive backing to adhere the films to surfaces, and custom measurements, cutting operations, and application of the coating or film to inanimate surfaces are also costly.

Therefore, a need exists for multifunctional coatings that can be formulated with added antimicrobial agents such as silver nanoparticles to enhance effectiveness of coatings. The additional feature of varying patterns throughout a coated surface via digital means with in-line changes in pitch, height, width, and other parameters as needed would provide advantages and rapid turnarounds which are not attainable using photolithography. The ability to print varying or areas of distinct patterns directly onto inanimate surfaces rather than fabricating pre-patterned adhesive coatings would also result in cost savings and other advantages. Furthermore, the ability to print stamp molds as needed instead of using traditional fabrication methods would also save considerable time and cost, since digital planning and printing of the molds is faster than mixing, pouring, oven curing and peeling the soft mold from a master mold to obtain the inverse structure needed to imprint the microtopography patterns.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An antimicrobial composition is disclosed. The antimicrobial coating composition includes at least one cured phase change ink which may include one or more cross-linked polymers, a photoinitiator, a wax, a gellant, and an antimicrobial additive. The composition also includes an engineered surface topography formed by the cured phase change ink.

Certain implementations may include an antimicrobial coating composition where the one or more acrylate monomers is present in an amount of from about 4.0% to about 80.0% based on a total weight of the antimicrobial coating composition. These one or more acrylate monomers may include difunctional acrylate monomers, trifunctional acrylate monomers, tetrafunctional acrylate monomer, and pentafunctional acrylate monomers, or combinations thereof. The antimicrobial coating composition further may include a pentafunctional acrylate monomer and a difunctional acrylate monomer. The wax may be present in an amount ranging from about 2.5% to about 15%, based on a total weight of the antimicrobial coating composition. The wax further may include a crosslinkable acrylate wax. The gellant is present in an amount ranging from about 2.5% to about 15.0%, based on a total weight of the antimicrobial coating composition. The gellant may include a radiation curable gellant. The radiation curable gellant further may include an amide gellant. The antimicrobial additive may be present in an amount ranging from about 0.01% to about 5.00%, based on a total weight of the antimicrobial coating composition. The antimicrobial additive may include metal nanoparticles, ionic-polymer metal composite nanoparticles, quaternary ammonium compounds, n-halamine molecules, biguanides, metal oxides, or combinations thereof. The antimicrobial additive may include silver nanoparticles. Certain embodiments of the antimicrobial composition may include an engineered surface topography with an engineered roughness index (ERI) of from about 5 to about 50. The engineered surface topography may include protruding features spaced apart from about 1 to about 5000 nm, having a height of from about 10 to about 5000 nm, or having a ratio of an actual surface area to a geometric surface area of from about 2 to about 40.

A method of preparing a textured antimicrobial surface is disclosed. The method may include designing a template having a texture, printing the template onto a substrate using an uncured antimicrobial ink, and providing a light source to crosslink the uncured antimicrobial ink.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
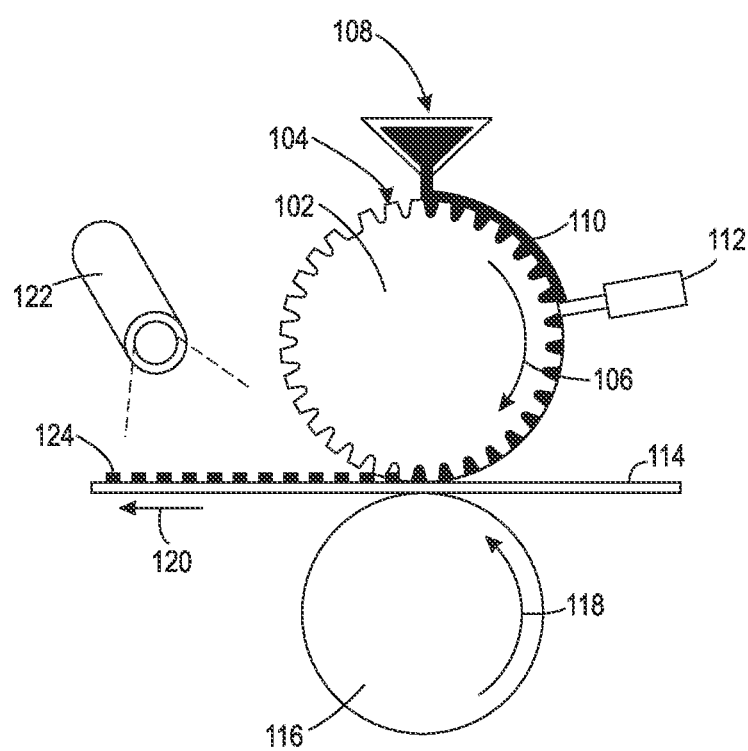
FIG. 1 is a schematic illustrating a process for applying an antimicrobial ink to a substrate using a transfer roll process, according to an embodiment.

It should be noted that some details of the figures may have been simplified and are shown to facilitate understanding of the embodiments rather than to maintain strict structural accuracy, detail, and scale.

DESCRIPTION OF THE EMBODIMENTS

Reference will now be made in detail to embodiments of the present disclosure. The following description is merely exemplary.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range "from about 2 to about 4" also discloses the range "from 2 to 4."

As used here, "metal acrylate(s)," such as, "silver acrylate(s)," is collective for acrylate monomers comprising at least one metal atom, such as, a silver atom, for use in polymers, such as, silver acrylate and silver methacrylate which are monomers for a polymer comprising silver.

The term, "antibacterial," as used herein refers to the property of a composition for inhibiting or destroying the growth of bacteria. In other words, an ink or ink component comprising antibacterial properties is effective in killing bacteria, or in inhibiting growth or propagation of bacteria, including as a printed image or structure.

The term, "antimicrobial," as used herein refers to an agent, or the property imparted by the agent, that kills or inhibits growth of microorganisms or microbes. An antibacterial agent, or property thereof, is an antimicrobial agent. Microorganisms include, for example, bacteria, fungi, algae, other single celled organisms, protists, nematodes, parasites, other multicellular organisms, other pathogens and so on. In other words, an ink or ink component comprising antimicrobial properties is effective in killing microbes, or in inhibiting growth and propagation of microbes, including as a printed image or structure.

The term, "nano," as used in, "silver nanoparticles," indicates a particle size of less than about 1000 nanometers (nm). In embodiments, the silver nanoparticles have a particle size of from about 0.5 nm to about 1000 nm, from about 1 nm to about 500 nm, from about 1 nm to about 100 nm, from about 1 nm to about 20 nm. The particle size is defined herein as the average diameter of the silver nanoparticles, as determined by TEM (transmission electron microscopy.) In embodiments, the composite nanoparticle has a volume average particle diameter (D50) of from about 10 to about 600 nanometers, or from about 10 to about 300 nanometers, or from about 10 to about 200 nanometers.

A polymer can be identified or named herein by the two or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. Also, a polymer can be composed of a styrene monomer and an acrylate monomer, and in that case, once polymerized, can be identified based on the monomers used. Hence, if the acrylate is butyl acrylate, the resulting polymer can be called a styrene polymer, a butyl acrylate polymer, a styrene/acrylate polymer and so on.

By, "two dimension," or grammatic forms thereof, such as, 2-D, is meant to relate to a structure or surface that is substantially without measurable or discernible depth, without use of a mechanical measuring device. Generally, the surface is identified as flat, and emphasizes height and width, and lacks the illusion of depth or thickness. Thus, for example, toner is applied to a surface to form an image or coating and generally, that layer of fused toner is from about 1 micrometer (μm) to about 10 μm in thickness. Nevertheless, that application of toner to a flat surface is considered herein as a two dimensional application. The surface can be a sheet or a paper, for example. This definition is not meant to be a mathematic or scientific definition at the molecular level but one which to the eye of the viewer or observer, there is no illusion of thickness. A thicker layer of toner, such as one which might be identified as providing, "raised lettering," on a surface is for the purposes herein, included in the definition of 2-D.

By, "three dimension," or grammatic forms thereof, such, as, 3-D, is meant to relate to a structure composed of plural layers or particle depositions of toner that aggregate or assemble to yield a form, a shape, a construct, an object and the like that, for example, need not be applied to a surface or structure, can be autonomous and/or has a thickness or depth. Printing as used herein includes producing 3-D structures. Printing on a surface or structure also is used herein to include forming a 3-D structure by deposition of plural layers of toner. Often, the first layer is printed on a support, surface, substrate or structure. Successive layers of toner are placed thereon and the already deposited (and optionally adhered or solidified) toner layer or layers is considered herein a surface or a substrate.

The terms "substrate," "media substrate," "print substrate," and "print media" generally refer to a usually flexible physical sheet of paper, polymer, Mylar® material, plastic, or other suitable physical print media substrate, fabric, sheets, webs, etc., for images, whether precut or web fed.

The term "printing device" or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing device" may print upon a surface in a manner that may be raised above the top surface of a substrate and further described as 2-dimensional (2D), 2.5-dimensional (2.5D), or 3-dimensional (3D), resulting in textured, structured, or raised print surfaces as printed by a "printing device." A "printing system" may handle sheets, webs, substrates, and the like. A printing system can place marks on any surface, and is any machine that reads marks on input sheets, or any combination of such machines.

All physical properties that are defined hereinafter are measured at 20° C. to 25° C. unless otherwise specified. The term "room temperature" refers to a temperature ranging from about 20° C. to about 25° C., such as about 22° C., unless otherwise specified.

Antimicrobial compositions are provided comprising an antimicrobial ink comprising a radiation curable or crosslinkable acrylate monomer, a photoinitiator, a wax, a gellant, an optional colorant, an optional UV stabilizer, and an antimicrobial additive. The antimicrobial coating further comprises a textured surface or engineered surface topography, wherein the surface comprises protruding features spaced apart from about 1 to about 1000 nm, and a roughness index of from about 5 to about 50. The engineered surface topography may comprise protruding features having a height of from about 10 to about 500 nm. The engineered surface topography may have a ratio of an actual surface area to a geometric surface area of from about X to about Y. The engineered surface topography or textured surface may enhance the microbial resistance of the antimicrobial coating composition via the combination of effects with the composition of the coating, which may include the addition of antimicrobial agents such as silver nanoparticles to enhance the antimicrobial effectiveness of such coatings.

In certain embodiments a textured antimicrobial surface may be provided by one or more methods, including preparing a textured antimicrobial surface by designing a template comprising a texture, printing a negative of the template onto a stamping substrate, impressing the stamping substrate onto a surface printed using an uncured antimicrobial ink, and providing a light source to crosslink the uncured antimicrobial ink. Embodiments for providing a textured antimicrobial surface may include designing a template comprising a texture, printing the template onto a substrate using an uncured antimicrobial ink, and providing a light source to crosslink the uncured antimicrobial ink. Still other embodiments for providing a textured antimicrobial surface having an engineered surface topography may include applying an uncured antimicrobial ink to a textured roll, transferring the uncured antimicrobial ink from the textured roll to a substrate, and providing a light source to crosslink the uncured antimicrobial ink.

The antimicrobial phase change ink compositions and methods herein can be applied to indirect printing applications wherein the ink is first applied imagewise onto an intermediate receiving member such as a drum, belt, etc., using an ink jet print head. The ink wets and spreads on the intermediate receiving member to form a transient image. The transient image then undergoes a change in properties such as partial or complete drying, thermal or photo-curing, gelation, etc., and the resulting transient image is then transferred to the final image receiving substrate. The inks can be designed and optimized to be compatible with the different subsystems including jetting, transfer, etc., that enable high quality printing at high speed. The anti-bacterial or antimicrobial phase change ink compositions herein can also be applied to direct printing applications.

Ink jet printing is one of the fastest growing imaging technologies. Some advantages of ink jet printing compared to other printing methods is the simplicity, lower production costs, reduced effluent waste, and less water and energy consumption. Based on the growing need for high performing products, especially when related to health and hygiene, the present water based digital printing inks with antibacterial properties fill a market need and provide consumers with a robust, effective, and lasting anti-microbial protection on any printable surface. Some key environments that can benefit from printing with the present antimicrobial phase change ink compositions include hospitals, daycare centers, care homes, schools, dental offices, doctor offices, hospitals (e.g., charts memos, pictures), other types of medical offices, veterinary practices, law offices and courts (e.g., legal documents), kitchens, and restaurants (e.g., menus). The present antimicrobial ink, images, or engineered surfaces printed therewith render any product more hygienic, helping the product maintain a fresh appearance by reducing or avoiding altogether odor causing or staining microbes and also avoid degradation of any important identification tag, label, or drug identification number (DIN) by the microbes themselves. In embodiments, the antimicrobial ink compositions comprise a silver composite nanoparticle. Silver exhibits anti-microbial activity against a broad range of micro-organisms. Silver is considered an ideal anti-microbial agent because it has a high effectiveness against a wide range of relevant microbes and is regarded as non-toxic, especially considering the low concentrations needed for effective decontamination.

In embodiments described herein, the indirect or direct printing of ridged, textured patterns coupled with antimicrobial additives offer an advantage of combining an engineered surface topography that inhibits attachment of microbes with the germicidal effect of antimicrobial or antibacterial additives. These textured micropatterns may be digitally printed directly onto a surface with varying deposition patterns or onto a stamp mask or roller if high throughput and large-area patterning is needed. These approaches may use UV-curable phase-change inks for printing textured patterns is a cost effective method to print a variety of surface topographies rapidly and directly upon an article instead of having to fabricate new silicon wafer molds or polydimethylsiloxane (PDMS) stamps each time a new micro-pattern needs to be utilized or evaluated for antimicrobial efficacy.

The antimicrobial phase change inks and topographical engineering methods herein can be used for any suitable or desired application. The inks are particularly suitable for anti-bacterial printing applications having the final goal of producing customizable, digitized anti-bacterial printed images, text, surface coatings, etc. Examples of applications include printing codes, labels, or logos on medical devices such as catheters, thermometers, and other medical devices, printing on menus, food packaging materials, cosmetic tools and products, etc.

In certain embodiments, the present antimicrobial phase change inks and topographical engineering methods may enable surfaces or objects to remain clean from microbes by directly printing or adhering a printed texturized film with antimicrobial agents onto high-touch surfaces. Hospitals and medical clinics are some areas needing an extra layer of antimicrobial protection but these coatings can extend to any high traffic area and objects such as handles, public seating on buses, trains and airports, check-in kiosks, toilets, counters, push carts/trolleys, elevator buttons and escalator railings. Medical implant surfaces are another concerning issue of persistent microbial contamination that is prevalent in peri- (during surgery) and post-operative patients who suffer from microbial proliferation at the implant-tissue interface causing deadly biofilm associated infections. Other applications include digitally printed ID codes, short-run printable materials, printing on three-dimensional medical components such as catheters, cardiac stents, programmable pacemakers, and any other desired three-dimensional substrate.

The sources of microorganisms can be bacterial, viral, or fungal. Microorganism contamination can come from typical handling of objects and papers, etc., from airborne microbes via sneezing and coughing, and other manner of spreading of infection from contaminated persons or contact with contaminated objects. Contact of these microbes with the present antimicrobial phase change ink compositions, including contact with a printed image or text prepared with the present antimicrobial phase change ink compositions, will inhibit the microbial growth and, in embodiments, destroy any possible colonization at the site of contact.

While the alteration or structuring the micro/nano-topography of a surface structure may play a key role in the extent of microbial attachment to the structure, surface roughness or topography alone will not deter bacterial adhesion, as some bacterial cells may thrive on surfaces with a certain degree of roughness depending on their shape. The attachment of bacteria to surfaces can vary based on their membrane rigidity and ability to stretch the cellular membrane to conform to surface. It has been found that spherical cells are less easily deformed and can adhere more effectively to smooth surfaces than a rod-shaped bacteria which prefers higher roughness for adhesion.

Additional characteristics of the surface other than topographical roughness that may play a role in microbial attachment include substrate chemistry, smoothness and grain size, nano-patterning or nano-architecture, surface free energy, degree of hydrophobicity, surface charge, geometry, multi-ordered structuring, scaling, etc. There are well-known examples of antibacterial surfaces found in naturally occurring surfaces. These natural surfaces vary in topographies, include micro-structural and nano-structural features, are self-cleaning, possess built-in anti-biofouling properties and exhibit superhydrophobicity. Examples of naturally occurring surfaces that display many combinations of the characteristics described are insect wings, such as those of dragonflies and cicadae, gecko feet, shark skin and plant leaves, the most prevalent being the lotus leaf.

Furthermore, some insects are known to possess the ability to kill microbes through the physical means of sharp surface nanostructures which can rupture or deform the bacterial cell wall resulting in bacterial death. The sharp nanostructures are usually nano-pillared in shape with a diameter of 50-250 nm, height of 80-250 nm and pitch of 100-250 nm. Early studies of naturally occurring surfaces focused more on surface wettability and antibiofouling characteristics which prohibited the growth of bacteria to the surface. These naturally occurring bactericidal mechanisms involve not only wetting and adhesion but also the arrangement, height, pitch and diameter of the nanopillars which results in a physico-mechanical destruction of the microbes. Some examples of naturally occurring bacterial surfaces that may be mimicked via printing techniques to provide antibacterial protection to various surfaces and objects are also known. Depending on the dimensions of the surface and other topographical features, bacterial efficacy of a surface may be directed to a specific type or class of bacteria. By combining this manner of surface topography design along with an antimicrobial agent such as silver nanoparticles or quaternary ammonium compounds (QAC), as well as others described later, long-lasting contact-based antibacterial surfaces can be efficiently designed to provide sufficient, effective and long-term antimicrobial activity.

Phase Change Inks

In embodiments, radiation curable phase-change ink compositions used as materials for fabricating structured or textured surfaces having an engineered surface topography or three-dimensional objects may have a room temperature modulus of from about 0.01 to about 5 GPa. These inks may comprise a radiation curable monomer, a photoinitiator, a wax and a gellant. Pigments, colorants, or other functional additives may be optionally included depending on the desired application. In further embodiments, disclosed are methods of making textured surfaces having an engineered surface topography using such radiation curable phase-change inks. Radiation curable phase-change inks as described herein may also be referred to as UV-curable phase change ink compositions or antimicrobial phase change ink compositions.

As referred to in this disclosure, the room temperature modulus values refer to the room temperature modulus values of ink compositions after the compositions are polymerized and cured. Furthermore, a monomer refers to a monomer that is reactive and curable.

Monomer

As described above, the ink compositions may comprise a monomer. Suitable monomers include radiation curable monomer compounds, such as acrylate and methacrylate monomer compounds, which are suitable for use as phase-change ink carriers. Examples of monomers include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl acrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers, such as difunctional acrylate monomers, trifunctional acrylate monomers, tetrafunctional, acrylate monomers, pentafunctional acrylate monomers, etc., may be used not only as reactive diluents, but also as materials that can increase the cross-link density of the cured image, thereby enhancing the toughness of the cured images.

In embodiments, the monomer may be selected from the group consisting of acrylic monomer, polybutadiene adducted with maleic anhydride, aliphatic urethane acrylate, polyester acrylate, 3-acryloxypropyltrimethoxysilane, and acryloxypropyl t-structured siloxane, or a mixture thereof. Other exemplary monomers include any monomer listed in Sartomer's product listing under "monofunctional monomers" (available at http://www.sartomer.com/).

In embodiments, the composition may comprise the monomer in an amount of from about 15 to about 80% by weight of the composition, such as from about 20 to about 55 or from about 25 to about 50% by weight. In other embodiments, the composition may comprise the monomer in an amount of from about 15 to about 35% by weight of the composition or from about 40 to about 60% by weight of the composition.

In embodiments, the monomers described above may impart on the cured inks a room temperature modulus of from about 0.01 to about 5 GPa, such as from about 0.51 to about 4.5 GPa, from about 1.01 to about 4 GPa, from about L51 to about 3.5 GPa, or from about 2.01 to about 3 GPa. The room temperature modulus may also be from about 0.01 to about 1.7 GPa, from about 1.7 to about 3.4 GPa, or from about 3.4 to about 5 GPa.

In embodiments, a phase-change ink set may comprise different ink compositions where each ink composition imparts a different room temperature modulus range. In embodiments, the phase-change ink set may comprise a first ink composition and at least one other ink composition where each ink composition has a different room temperature modulus between from about 0.01 to about 5 GPa. For example, the phase-change ink set may comprise a first ink composition having a room temperature modulus of from about 0.01 to about 2.5 GPa, such as from about 0.01 to about 1.25 or from about 1.25 to about 2.5 GPa, and a second ink composition having a room temperature modulus of from about 2.5 to about 5 GPa, such as from about 2.5 to about 3.75 GPa or from about 3.75 to about 5 GPa.

The phase-change ink set may comprise a first ink composition having a room temperature modulus of from about 0.01 to about 1.7 GPa, such as from about 0.01 to about 0.9 or from about 0.9 to about 1.7, a second ink composition having a room temperature modulus of from about 1.7 to about 3.4 GPa, such as from about 1.7 to about 2.6 GPa or from 2.6 to about 3.4 GPa, and a third ink composition having a room temperature modulus of from about 3.4 to about 5 GPa, such as from about 3.4 to about 4.3 or from about 4.3 to about 5 GPa.

In embodiments, the phase-change ink set may comprise from 2 to 10 different ink compositions, such as from 3 to 8, or 4 to 6, or 2 to 4, or 5 to 9 different ink compositions.

In embodiments, multifunctional acrylate and methacrylate monomers and oligomers may be included in the phase-change ink carrier as reactive diluents and as materials that can increase the crosslink density of the cured image, thereby enhancing the toughness of the cured images. Different monomer and oligomers may also be added to tune the plasticity or elasticity of the cured objects. Examples of suitable multifunctional acrylate and methacrylate monomers and oligomers include pentaerythritol tetraacrylate, pentaerythritol tetramethacrylate, 1,2-ethylene glycol diacrylate, 1,2-ethylene glycol dimethacrylate, 1,6-hexanediol diacrylate (available from Sartomer Co. Inc. as SR238), 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), neopentyl glycol diacrylate esters (available from Sartomer Co. Inc. as SR247), 1,4-butanediol diacrylate (BDDA, available from Sartomer Co. Inc. as SR213), tripropylene glycol diacrylate, dipropylene glycol diacrylate, dioxane glycol diacrylate (DOGDA, available from Sartomer Co. In. as CD536), amine modified polyether acrylates (available as PO 83 LR 8869, and/or LR 8889 (all available from BASF Corporation), trimethylolpropane triacrylate, ethoxylated trimethylolpropane triacrylate (available from Sartomer Co, Inc. as SR454), glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof.

The reactive diluent may be added in any desired or effective amount. For example, the reactive diluent may be added in an amount from about 1 to about 80% by weight of the carrier, such as about 10 to about 70%, or about 30 to about 50%, by weight of the carrier.

In embodiments, the curable monomer may be added to the ink composition with tackifiers, such as hydrocarbon tackifiers. Other exemplary tackifiers include FORAL 85, a glycerol ester of hydrogenated abietic (rosin) acid (commercially available from Hercules), FORAL 105, a pentaerythritol ester of hydroabietic (rosin) acid (commercially available from Hercules), CELLOLYN 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC 2300, NEVIAC 100, and NEVRAC 80 (commercially available from Neville Chemical Company), WINGTACK 86, a modified synthetic polyterpene resin (commercially available from Goodyear), and the like. The tackifier, when present, may be present in the ink in any desired or effective amount, such as at least about 0.1% by weight of the ink, at least about 5%, at least about 10%, or no more than about 50%.

Photoinitiator

In embodiments, the phase-change inks disclosed herein may comprise any suitable photoinitiator. A photoinitiator that absorbs radiation, for example UV light radiation, to initiate curing of the curable components of the ink may be used. Ink compositions containing acrylate groups or inks comprised of polyamides may include photoinitiators such as benzophenones, benzoin ethers, benzil ketals, α-hydroxyalkylphenones, α-alkoxyalkylphenones, α-aminoalkylphenones, and acylphosphine photoinitiators sold under the trade designations of IRGACURE and DAROCUR (available from BASF). Examples of suitable photoinitiators include 2,4,6-trimethylbenzoyldiphenylphosphine oxide (available as LUCIRIN TPO from BASF); 2,4,6-trimethylbenzoylethoxyphenylphosphine oxide (available as LUCIRIN TPO-L from BASF); bis(2,4,6-trimethylbenzoyl)-phenyl-phosphine oxide (available as IRGACURE 819 from BASF) and other acyl phosphines; 2-methyl-1-(4-methylthio)phenyl-2-(4-morphorlinyl)-1-propanone (available as IRGACURE 907 from BASF) and 1-(4-(2-hydroxyethoxy) phenyl)-2-hydroxy-2-methylpropan-1-one (available as IRGACURE 2959 from BASF); 2-benzyl 2-dimethylamino 1-(4-morpholinophenyl) butanone-1 (available as IRGACURE 369 from BASF); 2-hydroxy-1-(4-(4-(2-hydroxy-2-methylpropionyl)-benzyl)-phenyl)-2-methylpropan-1-one (available as IRGACURE 127 from BASF); 2-dimethylamino-2-(4-methylbenzyl)-1-(4-morpholin-4-ylphenyl)-butanone (available as IRGACURE 379 from BASF); titanocenes; isopropylthioxanthone (available as Darocur ITX from BASF); 1-hydroxy-cyclohexylphenylketone; benzophenone; 2,4,6-trimethylbenzophenone; 4-methylbenzophenone; 2,4,6-trimethylbenzoylphenylphosphinic acid ethyl ester; oligo(2-hydroxy-2-methy-1-(4-(1-methylvinyl)phenyl) propanone); 2-hydroxy-2-methyl-1-phenyl-1-propanone; benzyl-dimethylketal; and mixtures thereof. Amine synergists may also be used. Amine synergists are co-initiators that donate a hydrogen atom to a photoinitiator and thereby form a radical species that initiates polymerization (amine synergists can also consume oxygen dissolved in the ink; as oxygen inhibits free-radical polymerization its consumption increases the speed of polymerization). Exemplary amine synergists include, for example, ethyl-4-dimethylaminobenzoate and 2-ethylhexyl-4-dimethylaminobenzoate. This list is not exhaustive, and any known photoinitiator that initiates free-radical reaction upon exposure to a desired wavelength of radiation such as UV light may be used without limitation.

Optionally, the phase-change inks may also contain an amine synergist, which are co-initiators that can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include ethyl-4-dimethylaminobenzoate, 2-ethylhexyl-4-dimethylaminobenzoate, and the like, as well as mixtures thereof.

The photoinitiator may absorb radiation of about 200 to about 420 nm wavelengths to initiate cure, although use of initiators that absorb at longer wavelengths, such as the titanocenes that may absorb up to 560 nm, may also be used without restriction.

The total amount of initiator included in the ink composition may be from, for example, about 0.5 to about 15 wt % by weight of the ink composition, such as from about 1 to about 10 wt %.

Reactive Wax

The phase-change ink compositions disclosed herein may comprise a reactive wax. In embodiments, the reactive wax may comprise a curable wax component that is miscible with the other components and that will polymerize with the curable monomer to form a polymer. Inclusion of the wax promotes an increase in viscosity of the ink as it cools from the jetting temperature.

Exemplary waxes include those that are functionalized with curable groups. In embodiments, the curable groups may include, acrylate, methacrylate, alkene, allylic ether, epoxide and oxetane. These waxes may be synthesized by the reaction of a wax equipped with a transformable functional group, such as carboxylic acid or hydroxyl.

Suitable examples of hydroxyl-terminated polyethylene waxes that may be functionalized with a curable group include, mixtures of carbon chains with the structure $CH_3$-$(CH_2)_n$-$CH_2OH$, where there is a mixture of chain lengths, n, where the average chain length is, in embodiments, in the range of about 16 to about 50, and linear low molecular weight polyethylene, of similar average chain length. Suitable examples of such waxes include, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, NJ In embodiments, PRIPOL® 2033 is selected, PRIPOL® 2033 being a C-36 dimer diol mixtures, as well as other branched isomers which may include unsaturations and cyclic groups, available from Uniqema, New Castle, DE These alcohols may be reacted with carboxylic acids equipped with UV curable moieties to form reactive esters. Examples of these acids include acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$-$(CH_2)_n$-$COOH$, where there is a mixture of chain lengths, n, where the average chain length is in selected embodiments in the range of about 16 to about 50, and linear low molecular weight polyethylene, of similar average chain length. Suitable examples of such waxes include UNICID® 350, UNICID® 425, UNICID® 550 and UNICID® 700 with Mn equal to approximately 390, 475, 565 and 720 g/mol, respectively. Other suitable waxes have a structure $CH_3$-$(CH_2)_n$-$COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, NJ PRIPOL® 1009, as well as other branched isomers which may include unsaturations and cyclic groups, available from Uniqema, New Castle, DE may also be used. These carboxylic acids may be reacted with alcohols equipped with UV curable moieties to form reactive esters. Examples of these alcohols include 2-allyloxyethanol from Sigma-Aldrich Co.;

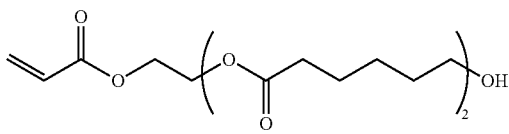

SR495B from Sartomer Company, Inc.;

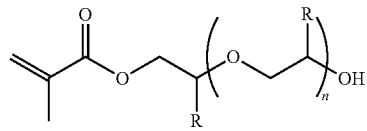

CD572 (R=H, n=10) and SR604 (R=Me, n=4) from Sartomer Company, Inc.

In embodiments, the optional curable wax is included in the ink in an amount of from, for example, about 1 to about 25% by weight of the ink, such as from about 2 to about 20% by weight of the ink, or from about 2.5 to about 15% by weight of the ink.

The curable monomer or prepolymer and curable wax together may form more than about 50% by weight of the ink, or at least 70% by weight of the ink, or at least 80% by weight of the ink.

Gellant

The antimicrobial phase change ink compositions disclosed herein may comprise any suitable gellant. The gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like; which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink composition. Mixtures of one or more gellants may be used to effect the phase-change transition.

The phase change nature of the gellant may be used to cause a rapid viscosity increase in the jetted ink composition following jetting of the ink to the substrate. In particular, jetted ink droplets may be pinned into position on a receiving substrate with a cooler temperature than the ink-jetting temperature of the ink composition through the action of a phase-change transition.

The temperature at which the ink composition forms the gel state is any temperature below the jetting temperature of the ink composition, for example any temperature that is about 10° C. or more below the jetting temperature of the ink composition. There is a rapid and large increase in ink viscosity upon cooling from the jetting temperature at which the ink composition is in a liquid state, to the gel transition temperature, at which the ink composition converts to the gel state. The ink composition of some embodiments may show at least a 102.5-fold increase in viscosity.

Suitable gellants may gel the monomers/oligomers in the ink vehicle quickly and reversibly, and demonstrate a narrow phase-change transition, for example within a temperature range of about 20° C. to about 85° C. The gel state of exemplary ink compositions should exhibit a minimum of 102.5 mPa·s, such as 103 mPa·s, increase in viscosity at substrate temperatures, for instance, from about 30° C. to about 70° C., compared to the viscosity at the jetting temperature. In some embodiments, the gellant-containing ink compositions rapidly increase in viscosity within 5° C. to 10° C. below the jetting temperature and ultimately reach a viscosity above 104 times the jetting viscosity, for example about 105 times the jetting viscosity.

Suitable gellants include a radiation curable gellant comprised of a curable amide, a curable polyamide-epoxy acrylate component and a polyamide component; a curable composite gellant comprised of a curable epoxy resin and a polyamide resin; mixtures thereof and the like, as disclosed in U.S. Pat. No. 8,334,026, the disclosure of which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants may be amphiphilic in nature to improve wetting when the composition is used over a substrate having silicone or other oil thereon. "Amphiphilic" refers to molecules that have both polar and non-polar parts of the molecule. For example, the gellants may have long non-polar hydrocarbon chains and polar amide linkages.

Amide gellants include those described in U.S. Pat. Nos. 7,531,582, 7,276,614 and 7,279,587, the entire disclosures of which are incorporated herein by reference.

The amide gellant may be a compound of the following formula (I):

(I)

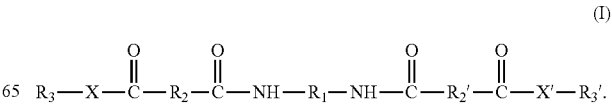

In formula (I), R1 may be:
(i) an alkylene group (wherein an alkylene group is a divalent aliphatic group or alkyl group, including linear and branched, saturated and unsaturated, cyclic and acyclic, and substituted and unsubstituted alkylene groups; and wherein heteroatoms, such as oxygen, nitrogen, sulfur, silicon, phosphorus, boron, and the like either may or may not be present in the alkylene group) having from about 1 to about 12 carbon atoms, such as from about 1 to about 8, or from about 1 to about 5 carbon atoms;
(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 to about 15 carbon atoms, such as from about 3 to about 10, or from about 5 to about 8 carbon atoms;
(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 to about 32 carbon atoms, such as from about 6 to about 22, or from about 6 to about 12 carbon atoms; or
(iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 to about 32 carbon atoms, such as from about 6 to about 22, or from about 7 to about 15 carbon atoms.

Unless otherwise specified, the substituents on the substituted alkyl, aryl, alkylene, arylene, arylalkylene, and alkylarylene groups disclosed above and hereinafter may be selected from halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like. Optionally, two or more substituents may be joined together to form a ring.

In formula (I), R2 and R2' each, independently of the other, may be:
(i) alkylene groups having from about 1 to about 54 carbon atoms, such as from about 1 to about 48, or from about 1 to about 36 carbon atoms;
(ii) arylene groups having from about 5 to about 15 carbon atoms, such as from about 5 to about 13, or from about 5 to about 10 carbon atoms;
(iii) arylalkylene groups having from about 6 to about 32 carbon atoms, such as from about 7 to about 33, or from about 8 to about 15 carbon atoms; or
(iv) alkylarylene groups having from about 6 to about 32 carbon atoms, such as from about 6 to about 22, or from about 7 to about 15 carbon atoms.

In formula (I), R3 and R3' each, independently of the other, may be either:
(a) photoinitiating groups, such as groups derived from 1-(4-(2-hydroxyethoxy)phenyl)-2-hydroxy-2-methyl-propan-1-one, of the formula (II):

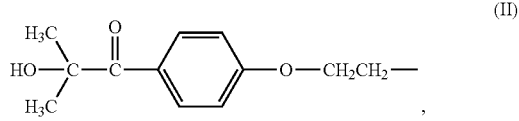

groups derived from 1-hydroxycyclohexylphenylketone, of the formula (III):

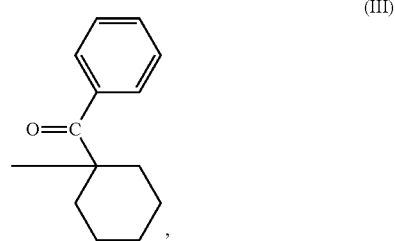 [SMILES: CCC1(C(=O)c2ccccc2)CCCCC1]

groups derived from 2-hydroxy-2-methyl-1-phenylpropan-1-one, of the formula (IV):

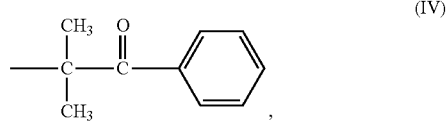

groups derived from N,N-dimethylethanolamine or N,N-dimethylethylenediamine, of the formula (V):

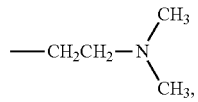

or the like; or
(b) a group which is:
(i) an alkyl group (wherein an alkyl group includes linear and branched, cyclic and acyclic, and substituted and unsubstituted alkyl groups, and wherein hetero atoms such as oxygen, nitrogen, sulfur, silicon, phosphorus, boron, and the like, may optionally be present in the alkyl group) having from about 2 to about 100 carbon atoms, such as from about 3 to about 60, or from about 4 to about 30 carbon atoms;
(ii) an aryl group (wherein an aryl group includes substituted and unsubstituted aryl groups) having from about 5 to about 100 carbon atoms, such as from about 5 to about 60, or from about 6 to about 30 carbon atoms, such as phenyl or the like;
(iii) an arylalkyl group having from about 5 to about 100 carbon atoms, such as from about 5 to about 60, or from about 6 to about 30 carbon atoms, such as benzyl or the like; or (iv) an alkylaryl group having from about 5 to about 100 carbon atoms, such as from about 5 to about 60, or from about 6 to about 30 carbon atoms, such as tolyl or the like.

In addition, in formula (I), X and X' each, independently of the other, may be an oxygen atom or a group of the formula —NR4-, wherein R4 is:

(i) a hydrogen atom;

(ii) an alkyl group having from about 5 to about 100 carbon atoms, such as from about 5 to about 60 or from about 6 to about 30 carbon atoms;

(iii) an aryl group having from about 5 to about 100 carbon atoms, such as from about 5 to about 60 or from about 6 to about 30 carbon atoms;

(iv) an arylalkyl group having from about 5 to about 100 carbon atoms, such as from about 5 to about 60 or from about 6 to about 30 carbon atoms; or (v) an alkylaryl group having from about 5 to about 100 carbon atoms, such as from about 5 to about 60 or from about 6 to about 30 carbon atoms.

Further details may be found, for example, in U.S. Pat. Nos. 7,279,587 and 7,276,614.

The gellant may be a composite gellant, for example, a gellant comprised of a curable epoxy resin and a polyamide resin. Suitable composite gellants are described in commonly assigned U.S. Pat. No. 7,563,487, the entire disclosure of which is incorporated herein by reference.

The epoxy resin component in the composite gellant may be any suitable epoxy group-containing material. The epoxy group containing component includes the diglycidyl ethers of either polyphenol-based epoxy resin or a polyol-based epoxy resin, or mixtures thereof. That is, the epoxy resin has two epoxy functional groups that are located at the terminal ends of the molecule. The polyphenol-based epoxy resin is a bisphenol A-co-epichlorohydrin resin with not more than two glycidyl ether terminal groups. The polyol-based epoxy resin may be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp., such as DER 383, or the dipropyleneglycol-based resins from Dow Chemical Corp., such as DER 736. Other sources of epoxy-based materials originating from natural sources may be used, such as epoxidized triglyceride fatty esters of vegetable or animal origins, for example epoxidized linseed oil, rapeseed oil, and the like, or mixtures thereof. Epoxy compounds derived from vegetable oils such as the VIKO-FLEX line of products from Arkema Inc., Philadelphia PA may also be used. The epoxy resin component is thus functionalized with acrylate or (meth)acrylate, vinyl ether, allyl ether, and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. The polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid, and the like, and a polyamine, such as a diamine (for example, alkylenediamines such as DYTEK series diamines, ethylenediamine, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides (available from Cognis Corporation (formerly Henkel Corp.)); in particular VERSAMID 335, VERSAMID 338, VERSAMID 795, and VERSAMID 963, all of which have low molecular weights and low amine numbers; and the SYLVAGEL polyamide resins (available from Arizona Chemical Company), and variants thereof including polyether-polyamide resins may be employed. The composition of the SYLVAGEL resins obtained from Arizona Chemical Company are described as polyalkyleneoxydiamine polyamides with the general formula (IX),

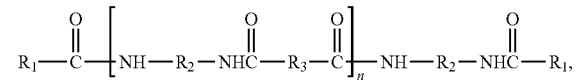

(IX)

wherein R1 is an alkyl group having at least seventeen carbon atoms, R2 includes a polyalkyleneoxide, R3 includes a C-6 carbocyclic group, and n is an integer of at least 1.

The gellant may also comprise a curable polyamide-epoxy acrylate component and a polyamide component, such as those disclosed in commonly assigned U.S. Pat. No. 7,632,546, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation-curable via free-radical initiation and enable chemical bonding of the gellant to the cured ink vehicle. A commercially available polyamide-epoxy acrylate is PHOTOMER RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as from about 1 to about 50 wt % of the ink, or from about 2 to about 20 wt %, or from about 3 to about 10 wt %.

Many of the compounds thus prepared can exhibit gel-like behavior when present in solutions. Examples of materials in which the present compounds can be dissolved include curable monomers such as, for example, propoxylated neopentyl glycol diacrylate, such as SR9003®, commercially available from Sartomer Co. Inc. "Gel-like behavior" refers to that the compounds undergo a relatively sharp increase in viscosity over a relatively narrow temperature range. Some compounds as disclosed herein undergo a change in viscosity of at least about 103 centipoise, at least about 105 centipoise, or at least about 106 centipoise, over a temperature range of at least about 5° C., at least about 10° C., or at least about 30° C., although the viscosity change and the temperature range can be outside of these ranges, and compounds that do not undergo changes within these ranges are also included herein.

Colorant

The antimicrobial phase change ink compositions disclosed herein may optionally comprise a colorant. The optional colorant, if present, may be present in a colored marking material in any desired amount, for example from about 0.5 to about 75% by weight of the marking material, such as about 1 to about 50% or from about 1 to about 25%, by weight of the marking material.

Any suitable colorant may be used in embodiments herein, including dyes, pigments, or combinations thereof. As colorants, examples may include any dye or pigment capable of being dispersed or dissolved in the vehicle. Examples of suitable pigments include, for example, Paliogen Violet 5100 (BASF); Paliogen Violet 5890 (BASF); Heliogen Green L8730 (BASF); Lithol Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); Lithol Scarlet 4440 (BASF); Bon Red C (Dominion Color Company); Oracet Pink RF (Ciba); Paliogen Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); SPECTRA PAC® C Orange 16 (Sun Chemical 276-3016); Heliogen Blue K6902, K6910 (BASF); SUNFAST® Magenta 122 (Sun Chemical 228-0013); Heliogen Blue D6840, D7080 (BASF); Sudan Blue OS (BASF); Neopen Blue FF4012 (BASF); PV Fast Blue B2G01 (Clariant); Irgalite Blue BCA (Ciba); Paliogen Blue 6470 (BASF); Sudan Orange G (Aldrich); Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

Antioxidants

The antimicrobial phase change ink compositions disclosed herein may also optionally contain an antioxidant. The optional antioxidants can protect the images from oxidation and can also protect the ink components from oxidation during the heating portion of the ink preparation process. Specific examples of suitable antioxidant stabilizers include NAUGARD® 524, NAUGARD® 635, NAUGARD® A, NAUGARD® I-403, and NAUGARD® 959, commercially available from Crompton Corporation, Middlebury, CT; IRGANOX® 1010 and IRGASTAB® UV 10, commercially available from Ciba Specialty Chemicals; GENORAD 16 and GENORAD 40 commercially available from Rahn AG, Zurich, Switzerland, and the like, as well as mixtures thereof. When present, the optional antioxidant is present in the ink in any desired or effective amount. For example, the optional antioxidant may be present in an amount from about 0.01 to about 20%, such as about 0.1 to about 10%, or about 1 to about 5%, by weight of the ink carrier.

Antimicrobial Additives

In embodiments, the present antimicrobial phase change ink compositions may comprise an ionic polymer-metal composite; wherein the ionic-polymer metal composite nanoparticle acts as a reservoir for the delivery of metal ions for anti-bacterial effect, antifungal effect, antiviral biocide effect, or a combination thereof. In certain embodiments, the composite nanoparticle comprises a core and a shell; wherein the core comprises a styrene/acrylate polymer core resin, optionally comprising a metal; and wherein the shell comprises a metal.

Any suitable or desired metal can be selected for embodiments herein provided that the metal imparts the desired anti-bacterial effect, antifungal effect, antiviral biocide effect, or combination thereof. While other metals can be used, only certain ones will have anti-bacterial properties. In embodiments, Co, Cu, Ni, Au and Pd can be used in a silver composite, wherein the Co, Cu, Ni, Au, Pd, or mixture or combination thereof can impart anti-bacterial and/or antimicrobial properties. See, for example, Yasuyuki M, Kunihiro K, Kurissery S, et al. Biofouling 2010 October; 26(7): 851-8) describing Co, Cu, Ni as well as Au (and Pd). In embodiments, Ag and Cu are selected. In other embodiments, composites including Pt, Al, Cr, In, and mixtures and combinations thereof, can be selected.

In embodiments, the silver nanoparticles may comprise solely elemental silver or may be a silver composite or alloy, including composites or alloys with other metals. Such metal-silver composite may include either or both of (i) one or more other metals and (ii) one or more non-metals. Suitable other metals include for example Al, Au, Pt, Pd, Cu, Co, Cr, In, and Ni, particularly the transition metals for example Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include for example Si, C, and Ge. The various components of the silver composite may be present in an amount ranging, for example, from about 0.01% to about 99.9% by weight, particularly from about 10% to about 90% by weight. In embodiments, the silver composite is a metal alloy composed of silver and one, two or more other metals, with silver comprising for example at least about 20% of the nanoparticles by weight, particularly greater than about 50% of the nanoparticles by weight. Unless otherwise noted, the weight percentages recited herein for the components of the silver-containing nanoparticles do not include stabilizer.

Those skilled in the art will appreciate that metals other than silver may be useful and can be prepared or combined with antimicrobial phase change ink compositions in accordance with the methods disclosed herein. Thus, for example, composites may be prepared with nanoparticles of copper, gold, palladium, or composites of such exemplary metals. See, for example, Adams C P, Walker K A, Obare S O, Docherty K M, PLoS One. 2014 Jan. 20; 9(1):e85981. doi: 10.1371/journal.pone.0085981, eCollection 2014, describing palladium as an anti-microbial.

In embodiments, the optional core metal, if present, is selected from the group consisting of silver, cobalt, copper, nickel, gold, palladium, and combinations thereof; and the shell metal is selected from the group consisting of silver, cobalt, copper, nickel, gold, palladium, and combinations thereof. In certain embodiments, the optional core metal, if present, is silver; and the shell metal is silver.

In embodiments, the composite nanoparticle shell comprises a resin, wherein the resin comprises a silver composite monomer selected from the group consisting of a silver acrylate monomer, a silver methacrylate monomer, and combinations thereof. In certain embodiments, the composite nanoparticle shell comprises a resin, wherein the resin comprises a silver composite monomer selected from the group consisting of a silver acrylate monomer, a silver methacrylate monomer, and combinations thereof; wherein the silver composite monomer is present in the shell resin in an amount of from about 0.01 percent to about 10 percent, or from about 0.05 percent to about 8 percent, or from about 0.05 to about 4 percent, by weight based on the total weight of the shell reins.

In embodiments, the composite nanoparticle shell comprises a resin, wherein the shell resin comprises a co-monomer selected from the group consisting of methyl methacrylate, butyl acrylate, diacrylate, cyclohexyl methacrylate, styrene, methacrylic acid, dimethylaminoethyl methacrylate, and combinations thereof.

In embodiments, the core resin comprises a silver composite monomer selected from the group consisting of a silver acrylate monomer, a silver methacrylate monomer, and combinations thereof.

In embodiments, the optional core metal, if present, and the shell metal comprise a composite comprising silver and one or more other metals; wherein the optional core metal, if present, and the shell metal comprise a composite comprising silver and one or more non-metals; or wherein the optional core metal, if present, and the shell metal comprise a composite comprising silver, one or more other metals, and one or more non-metals.

In embodiments, the composites may comprise further nanostructured materials, such as, without limitation, carbon nanotubes (CNTs, including single-walled, double-walled, and multi-walled), graphene sheet, nanoribbons, nano-anions, hollow nanoshell metals, nano-wires and the like. In embodiments, CNTs may be added in amounts that enhance electrical and thermal conductivity. The shell, may comprise a resin comprising a metal or a reduced metal, and may cover the entire surface of a core particle or portions thereof. Hence, a shell can encompass the entire exterior surface of a particle, thereby encapsulating a core particle or can be found, for example, at sites on the surface of a core, as isolated patches of varying size, islands and so on.

In embodiments, composite core/shell nanoparticles are provided wherein the core can comprise a styrene/acrylate resin, optionally comprising a metal, and a shell comprises at least one composite styrene/acrylate—metal ion polymer resin, such as, the above described silver ionomers. A core may be prepared by polymerization, such as, emulsion polymerization, of acrylate and styrene monomers. A shell resin may be prepared, as described above, and then added to an emulsion of core particles to form a shell encapsulating the core resin particles. In embodiments, a shell resin is synthesized on core particles, wherein the appropriate shell monomers and an initiator are added to the core particles. In embodiments, a metal ion is reduced on a resin or on a core particle to form a shell thereover. In embodiments, metal can be reducing during formation of a core. In embodiments, a metal can be reduced on a core. In embodiments, metal can be reduced on a shell.

In embodiments, antimicrobial phase change ink compositions as disclosed herein may include silver metal ions. Silver metal ions are known to possess antimicrobial properties and may be referred to as an antimicrobial metal ion. Suitable anti-microbial metals, metal nanoparticles, and metal ions include, but are not limited to, those discussed hereinabove, as well as silver, copper, zinc, gold, mercury, tin, lead, iron, cobalt, nickel, manganese, arsenic, antimony, bismuth, barium, cadmium, chromium and thallium. Metal ions of, for example, silver, copper, zinc and gold or combinations thereof are considered safe for human use. Hence, silver ions, alone or in combination with copper or zinc or both, have a high ratio of efficacy to toxicity, i.e., high efficacy to low toxicity. In some embodiments, antimicrobial phase change ink compositions as disclosed herein may include other metallic or metal oxides or metal oxide nanoparticles that exhibit antimicrobial and biocidal activity including copper oxide, silver, gold, zinc oxide, zinc pyrithione, calcium oxide, iron (III) oxide, titanium dioxide and magnesium oxide, and others known in the art.

In some embodiments, antimicrobial phase change ink compositions as disclosed herein may include biguanides or bisbiguanides. Biguanides are organic compounds with the general formula $HN(C(NH)NH_2)_2$. Most biguanides are colorless solids soluble in water resulting in highly basic solutions. These biguanide solutions may slowly hydrolyze to ammonia and urea. Bisbiguanides are a related category of chemically related compounds also known for their bactericidal properties. These compounds include the antiseptics chlorhexidine, polyaminopropyl biguanide (PAPB), polihexanide, and alexidine. Chlorhexidine, for example, is a cationic bisbiguanide that disrupts microbial cell membranes and precipitates cell contents, widely for skin antisepsis in veterinary medicine. Chlorhexidine has persistent activity on the skin, is nonirritating, is active in the presence of body fluids, and has rapid bactericidal activity.

In some embodiments, antimicrobial phase change ink compositions as disclosed herein may include N-halamine molecules. N-halamine containing composites and coatings are known to have biocidal effectiveness toward a broad spectrum of microorganisms, long-term stability, regenerability, safety to humans and environment, and low cost. An N-halamine is a compound comprising one or more nitrogen-halogen covalent bonds commonly formed by the halogenation of imide, amide, or amine groups. Upon contact with N-halamines or N-halamine containing materials, microorganisms undergo a halogen exchange reaction, causing the expiration of the cells. Compared with inorganic halogens such as chlorine or bromine, organic N-halamines are more stable, less corrosive, and have much less tendency to generate halogenated hydrocarbons. Examples of N-halamines useful in antimicrobial compositions include monomeric N-halamines such as 1,3-dichloro-5,5-dimethyl hydantoin, 3-bromo-1-chloro-5,5-dimethylhydantoin, and 1-chloro-2,2,5,5-tetramethyl-4-imidazolidinone.

In some embodiments, antimicrobial phase change ink compositions as disclosed herein may include quaternary ammonium compounds (QACs). Quaternary ammonium compounds (QACs) are sometimes also referred to as quats, and may be useful as biocides in several applications such as wound dressings, lotions, cleansers, and those as described herein. These compounds are cationic surfactants, or positively charged surface-active agents, that impact cell walls and membranes after relatively long contact times. The permanent positive charge of QACs makes them bind readily to the negatively charged surface of most microbes. QACs are generally very stable, mostly unaffected by pH levels, and remain effective on surfaces for prolonged periods of time. The antimicrobial activity QACs may be more selective than that of other disinfectants, however, they are generally very effective against bacterial biofilms. Examples of QACs include benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, and others known in the art.

Typical loadings of the antibacterial, antimicrobial, or biocide additives may range anywhere from about 0.01% to about 30% by weight of the total weight of the antimicrobial phase change ink compositions, or from about 0.1% to about 2.0%, or from about 1% to about 10% by weight of the total weight of the antimicrobial phase change ink compositions.

Engineered Surface Topography and Textured Surface Characterization

In certain embodiments, the combination of the antimicrobial phase change ink compositions described herein with an engineered surface topography provides advantaged resistance of surfaces from bacterial and microbial growth and/or contamination. These engineered topographical surfaces and their respective features may be characterized or described in several manners. The surface features may include protrusions, recesses, or other features created by direct printing or transfer of antimicrobial phase change ink compositions to a variety of substrates. These features in certain embodiments may include ranges of heights, spacings, physical properties, or combinations thereof in order to achieve advantageous surface interactivity with a variety of microbes or other potentially harmful spores or biological materials. In embodiments having more simplistic surfaces, a roughness factor (R) may be used as a measure of surface roughness or topographical character relevant to bioadhesion control or maintenance. Roughness factor, or R, can be defined as the ratio of actual surface area (Ract) to the geometric surface area (Rgeo); R=Ract/Rgeo. For simple surfaces, this roughness factor can be calculated from somewhat conventional measurements, such as profilometry. In an example of a 1 cm$^2$ piece of material, if the example sample is completely flat, the actual surface area and geometric surface area would both be 1 cm$^2$. A resulting roughness factor would be 1. Alternatively, if the flat surface was roughened by patterning, such as using photolithography and/or selective etching, the resulting actual surface area becomes much greater as compared to the original geometric surface area due to the additional surface area provided by the sidewalls of the recessed and/or protruding features generated. By way of example, if the resulting exposed surface area is twice the surface area of the original flat surface, the R value would therefore be 2. In embodiments of the antimicrobial coating compositions as described herein, the engineered surface topography may have a ratio of actual surface area to geometric surface area of from about X to about Y, of from about X to about Y, or of from about X to about Y. The roughness of such surfaces may be measured using contact and non-contact approaches, such as Ra, which measures an arithmetic mean deviation of the measured profile area, Rz, which measures an average peak to valley height of the profile, within a single sampling length over a surface, or other profilometry measurement methods known to those skilled in the art. In certain embodiments, Ra measurements may be used to characterize a smoothness of a sliding surface, while Rz measurements may be used to characterize a height of the surface or of certain protrusions or recesses therefrom. While the use of Ra alone may cause some points, such as single protrusions, to be overlooked it may be advantageous that both Ra and Rz be used together. Examples of contact profilometry methods include stylus type roughness testers which may have a measurement resolution of approximately 1 nm and a height measurement up to 1 mm, atomic force microscopy (AFM) which may have a measurement resolution of <0.01 nm, and a height measurement up to 10 microns. Non-contact profilometry methods include white light interferometers having a measurement resolution of <0.1 nm, and a height measurement up to approximately 3 mm, or laser microscopy, having a measurement resolution of approximately 0.1 nm, and a height measurement up to about 7 mm.

Engineered roughness index, or ERI, is another method of characterization of such engineered surfaces. ERI is a dimensionless ratio known in the art related to the characterization of surface topographies used in bioadhesion control or maintenance. Characterizations using ERI may account for the application specific deformation of topographic features and mechanical properties of certain substrate materials having engineered topographical surfaces. Furthermore, such engineered surface topography characterization may provide a more comprehensive quantitative description of engineered surface topography as compared to Wenzel's roughness factor, as noted in Wenzel R N. 1936, Resistance to solid surfaces to wetting by water. Ind Eng Chem 28:988-994, which is incorporated by reference in its entirety. Wenzel's description alone may not adequately capture the intricate surfaces of the engineered topographies as described in the present disclosure.

ERI may be expressed as a dimensionless ratio based on Wenzel's roughness factor, depressed surface fraction, and the degree of freedom of spore movement as follows:

$$ERI = \frac{r \times n}{1 - \phi}$$

where r is the Wenzel roughness ratio, referring to the ratio of the actual surface area to the projected planar surface area, where the actual surface area includes areas associated with feature tops, feature walls, and depressed areas between features and the projected planar surface area includes just the feature tops and depressions, n is the number of distinct surface features in the design of the surface, and φ is the area fraction of the tops of the distinct surface features. By way of example, a completely smooth surface would have an ERI=0. In certain embodiments, as well as those known in the art related to antifouling properties in marine applications, the use of this equation may enable modeling of the amount of microfouling spores per square millimeter. Increased ERI value is an indicator for a reduction in microfouling settlement in known applications. In certain embodiments, artificially nonpatterned nanoscale rough surfaces such as 2-µm-diameter circular pillars having an ERI=5.0, or 2-µm-wide ridges having an ERI=6.1 reduce fouling settlement by 36% and 31%, respectively, while a more regularly patterned surface composed of 2-µm-diameter circular pillars and 10-µm equilateral triangles having an ERI=8.7 reduces spore settlement by 58%.

Additional sources in the art, for example, Callow, et al., "Trends in the development of environmentally friendly fouling-resistant marine coatings," Nature Communications (2011), which is incorporated by reference in its entirety, also refers to ERII and ERIII, which involve additional geometric parameters of the surfaces:

$$ERI_I = \frac{r \times df}{1 - \varphi_s}$$

$$ERI_{II} = \frac{r \times n}{1 - \varphi_s}$$

where r is the Wenzel's roughness factor, $(1-\phi s)$ is the area fraction of feature tops, that is, the ratio of the depressed surface area between features and the projected planar surface area, and df is the degree of freedom of spore movement (1 or 2). Spore settlement may be shown to decrease with an increase in $ER_{II}$. Hydrophobicity, as measured by contact angle, or other surface measurements known in the art, of surface materials are also related to surface roughness as obtained by the Wenzel roughness factor, in some embodiments. In certain embodiments the character of the topographical features, such as bending moment or stiffness, may also result in nanoforce gradients that contribute to settlement of spores. In other words, the generation of the nanoforce gradients may be viewed as a function of the bending moment or stiffness of the protruding topographical features with which the cell is in contact. This concept, along with accounting for a number of distinct features in a topographical surface may be another predictor of inhibition by the topographies which has led to substitution of df by n, in a revised ERI model ($ER_{III}$), which is known to those skilled in the art.

Antimicrobial coating compositions as described herein may have an engineered roughness index (ERI) as characterized by any of the models described of from about 5 to about 50, or from about 5 to about 30, or from about 7 to about 20. Antimicrobial coating compositions as described herein may have an engineered surface topography with a ratio of an actual surface area to a geometric surface area of from about 2 to about 40, or from about 4 to about 30, or from about 10 to about 30.

Antimicrobial coating compositions as described herein may have engineered surface topography comprising protruding features spaced apart from about 1 to about 5000 nm, or from about 250 nm to about 2000, or from about 500 nm to about 1000 nm. The antimicrobial coating compositions as described herein may have protruding features having a height of from about 10 to about 5000 nm, or from about 400 nm to about 2000 nm, or from about 500 nm to about 1000 nm.

Printing Apparatus and Processes

The present radiation curable antimicrobial phase-change ink compositions, as well as the methods herein, may be employed with any desired printing system including systems suitable for preparing three-dimensional objects, such as a solid object printer, thermal ink jet printer (both with inks liquid at room temperature and with phase-change inks), piezoelectric ink jet printer (both with inks liquid at room temperature and with phase-change inks), acoustic ink jet printer (both with inks liquid at room temperature and with phase-change inks), thermal transfer printer, gravure printer, electrostatographic printing methods (both those employing dry marking materials and those employing liquid marking materials), and the like. In other embodiments, the ink materials may be used for manual preparation of three-dimensional objects, such as through the use of molds or by manual deposition of the ink material, to prepare a desired structured or textured surface, or three-dimensional object.

Ink jet printing devices are known in the art. For example, ink jet printing devices are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are generally three types of drop-on-demand ink jet systems. One type of drop-on-demand system is a piezoelectric device that has as its major components an ink-filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a substrate, such as an image receiving member or intermediate transfer member, with respect to the ink jetting head. That is, there is a small translation of the print head with respect to the substrate in between each rotation. This approach simplifies the print head design, and the small movements ensure good droplet registration. At the jet operating temperature, droplets of liquid ink are ejected from the printing device. When the ink droplets contact the surface of the recording substrate, they quickly solidify to form a predetermined pattern of solidified ink drops.

In embodiments, an ink jet printing device may be employed. The ink jet printing apparatus includes at least an ink jet print head and a print region surface toward which ink is jetted from the ink jet print head, wherein a height distance between the ink jet print head and the print region surface is adjustable. Therein, the ink jet print head is adjustable in spacing with respect to the print region surface so as to permit the ink jet print head to be moved from a first position for regular height printing to a second height distance that is greater than (that is, the spacing between the ink jet print head and the print region surface is greater than) the first height distance. The second height distance is not fixed, and may be varied as necessary for a given printing. Moreover, the second height distance may itself be changed during a printing, as necessary. For example, it may be desirable to adjust the height distance from the first position to a second position as an image is built-up by the ink jet print head, and then as the image continues to be built-up, to adjust the ink jet print head from the second position to a third position in which the spacing from the print region surface is even further increased, and so on as necessary to complete build-up of the object.

In embodiments, the ink jet print head or target stage may be movable in three dimensions, x, y, and z, enabling the buildup of an object of any desired size. Moreover, three dimensional objects may be formed with appropriate multiple passing of the ink jet print head over an area to achieve the desired object height and geometry. Jetting of ink from multiple different ink jets of the ink jet print head toward a same location of the image during a single pass may also be used to form raised height objects. As discussed below, in embodiments, each layer of ink may add from about 1 to about 6 mm in height to the image height. Knowing the total print height desired, the appropriate number of passes or jettings may be readily determined.

A controller may then control the ink jet print head to deposit the appropriate amount and/or layers of ink at locations of the image so as to obtain the image with the desired print heights and overall geometries therein. In certain embodiments, a printing system may employ additional printheads so as to build a target or specific surface topography in a single pass while utilizing a method that feeds a substrate through the printing system in a continuous manner.

The ink jet print head may support single color or full color printing. In full color printing, the ink jet print head typically includes different channels for printing the different colors. The ink jet print head may include four different sets of channels, for example one for each of cyan, magenta, yellow and black. In such embodiments, the ink jet print head is capable of printing either full color regular height prints when the ink jet print head is set at a minimum distance from the print region surface, or raised height prints of any color when the ink jet print head is at a distance greater than the minimum distance from the print region surface.

The structured or textured compositions or three-dimensional objects having an engineered surface topography prepared herein may be free-standing parts or objects, rapid prototyping devices, raised structures on substrates, such as, for example, topographical maps, or other desired objects. Any suitable substrate, recording sheet, or removable support, stage, platform, and the like, may be employed for depositing the three-dimensional objects thereon, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic substrates such as metals and wood, as well as meltable or dissolvable substrates, such as waxes or salts, in the case of removable supports for free-standing objects, and the like.

The ink compositions used in the printing apparatus described above may be prepared by any desired or suitable method. For example, the ink ingredients may be mixed together, followed by heating, to a temperature in embodiments of about 80° C. to about 120° C., and stirring until a homogeneous ink composition is obtained, followed by cooling the ink to ambient temperature (typically from about 20° C. to about 25° C.).

The ink compositions generally have melt viscosities at the jetting temperature (for example, the jetting temperature may be about 50° C. to about 120° C., such as about 60° C. to about 110° C., or about 70° C. to about 100° C.) of about 2 to about 30 centipoise, such as about 5 to about 20 centipoise, or about 7 to about 15 centipoise.

In embodiments, the inks are jetted at low temperatures, in particular at temperatures below about 110° C., such as from about 40° C. to about 110° C., or from about 50° C. to about 110° C., or from about 60° C. to about 90° C. At such low jetting temperatures, the conventional use of temperature differential between the jetted ink and the substrate upon which the ink is jetted to effect a rapid phase-change in the ink (i.e., from liquid to solid) may not be effective. The gellant may thus be used to affect a rapid viscosity increase in the jetted ink upon the substrate. In particular, jetted ink droplets may be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase-change transition in which the ink undergoes a significant viscosity change from a liquid state to a gel state (or semi-solid state).

In embodiments, the temperature at which the ink forms the gel state is any temperature below the jetting temperature of the ink, such as any temperature that is about 5° C. or more below the jetting temperature of the ink. In embodiments, the gel state may be formed at a temperature of about 25° C. to about 100° C., such as about 30° C. to about 70° C. A rapid and large increase in ink viscosity occurs upon cooling from the jetting temperature, at which the ink is in a liquid state, to the gel temperature, at which the ink is in the gel state. The viscosity increase is, in embodiments, at least a 102.5-fold increase in viscosity.

When the inks are in the gel state, the viscosity of the ink is in one embodiment at least about 1,000 centipoise, in another embodiment at least about 10,000 centipoise, and in yet another embodiment at least about 100,000 centipoise. Viscosity values in the gel state are in one embodiment at least about 103 centipoise, and in another embodiment at least about 104.5 centipoise, and in one embodiment no more than about 109 centipoise, and in another embodiment no more than about 106.5 centipoise. The preferred gel phase viscosity may vary with the print process. For example, the highest viscosities are preferred when jetting directly to porous paper, or when employing intermediate transfer, in order to minimize the effects of ink bleed and feathering. On the other hand, less porous substrates such as plastic may lead to the use of lower ink viscosities that control dot gain and agglomeration of individual ink pixels. The gel viscosity may be controlled by ink formulation and substrate temperature. An additional benefit of the gel state for radiation curable inks is that higher viscosities of about 103 to about 104 centipoise can reduce oxygen diffusion in the ink, which in turn can lead to a faster rate of cure in free radical initiation. In the present system, the maximum viscosity reached exceeds these values (about 105 to about 106 centipoise).

In embodiments, successive layers of the curable ink may be deposited to form an object having a selected height and shape. For example, objects of from about 1 to about 10,000 micrometers in height. The successive layers of the curable ink may be deposited to a build platform or to a previous layer of solidified material in order to build up a three-dimensional object in a layer-wise fashion. In embodiments, objects of virtually any design may be created, from a micro-sized scale to a macro-sized scale and may include simple objects to objects having complex geometries. The ink jet materials and method herein further advantageously provide a non-contact, additive process (as opposed to subtractive process such as computer numerical control machining) providing the built-in ability to deliver metered amounts of the present ink materials to a precise location in time and space.

In embodiments, a thickness of the first and each successive layer of the phase-change ink composition may be from about 0.02 to about 6 mm, such as about 0.52 to about 5.5 mm, about 1.02 to about 5 mm, about 1.52 to about 4.5 mm, or from about 2.02 to about 4 mm.

The gel nature of the present materials at room temperature prevents spread or migration of the printed droplet and allows for facile build-up of three-dimensional structures. Although there are no limits to the height or overall size of an object that may be created, very large objects may require intermediate curing in the deposition process. Due to the radiation curable nature of this material, the printed object may be cured by exposure to ultraviolet radiation at any point in the fabrication process resulting in more robust objects with a high degree of mechanical strength. "Curing" means that the curable compounds in the ink undergo an increase in molecular weight upon exposure to actinic radiation, such as crosslinking, chain lengthening, or the like.

In embodiments, the radiation curable phase-change inks disclosed herein may be cured after each layer of the three-dimensional object is deposited. In other embodiments, the inks may be cured upon completion of deposition of all layers of the three-dimensional object. The printed layers with the thickness of about 0.02 to about 6 mm, as described above, reduces the curing steps required to build a mechanically stable object, and further reduces the need to cure each layer after each deposition.

Curing of the ink may be affected by exposure of the ink image to actinic radiation at any desired or effective wavelength. For example, the wavelength may be about 200 to about 480 nanometers. Exposure to actinic radiation may be for any desired or effective period of time. For example, the exposure may occur for about 0.2 to about 30 seconds, such as about 1 to about 15 seconds.

In embodiments, an x, y, z movable substrate, stage, or build platform is employed to create a free-standing object. That is, there is no final substrate since the three-dimensional product is the free-standing, printed or fabricated object and not an image on a substrate. The removable build platform or support material may be any suitable material, for example, in embodiments, a non-curable material. Specific examples of suitable non-curable support materials include waxes, plastics, metals, wood, and glass, among others.

In embodiments, the structured surface or three-dimensional object may have both rigid and rubbery components. For example, one component may be printed by using material comprising a curable monomer that imparts a lower or higher room temperature modulus than a curable monomer of another component of the object. In embodiments, the three-dimensional object may have alternating rigid and flexible layers within a single object, such as a rubber-like post with a hard cap on the end. In such an example, a low modulus material may initially be printed, followed by a subsequent later of high modulus material, and the printed material may subsequently be cured. In alternate embodiments, non-curable inks, aqueous based inks or high-build viscous inks may be utilized in methods as described herein. Alternate embodiments may utilize inks that are note radiation cured or crosslinked, as inks may be dried, heated, or may crosslink or cure without the use of radiation or an external radiation or light source.

FIG. 1 is a schematic illustrating a process for applying an antimicrobial ink to a substrate using a transfer roll process, according to an embodiment. In this method, a transfer roll system 100 is shown having a roller 102 with a textured surface 104 which in operation rotates in rotational direction 106. As the roller 102 rotates, an ink delivery system 108 deposits or applies an uncured antimicrobial ink 110 onto the roller 102 to a thickness regulated in part by a doctor blade assembly 112 in contact with the roller 102 or ink 110 surface. A substrate 114 is moved in direction 120 through the system in contact with both the roller 102 on a top side and an impression roller 116 on the bottom side, which provides pressure to the opposite side of the substrate 114, while moving in rotational direction 118, thus transferring the uncured antimicrobial ink 110 from the textured roll 102 to the substrate 114. In this manner, an impression of the textured surface 104 of roller 102 is imparted to the print surface of the ink 110 prior to curing. As the substrate 114 exits the roller the ink 110 is subjected to a radiation source 122 such as a UV laser or other radiation source suitable for curing the type of ink used. Alternate embodiments may provide a heat source or radiation in wavelengths other than ultraviolet, such as infrared or visible, or combinations thereof. Alternate embodiments may also utilize UV lamps, UV LED light sources, other UV or radiation sources capable of providing required radiation to initiate curing or crosslinking in the ink, or combinations thereof. Upon exit, the cured ink surface results in a textured ink composition 124 on the surface of the substrate 114.

Figure 2A:
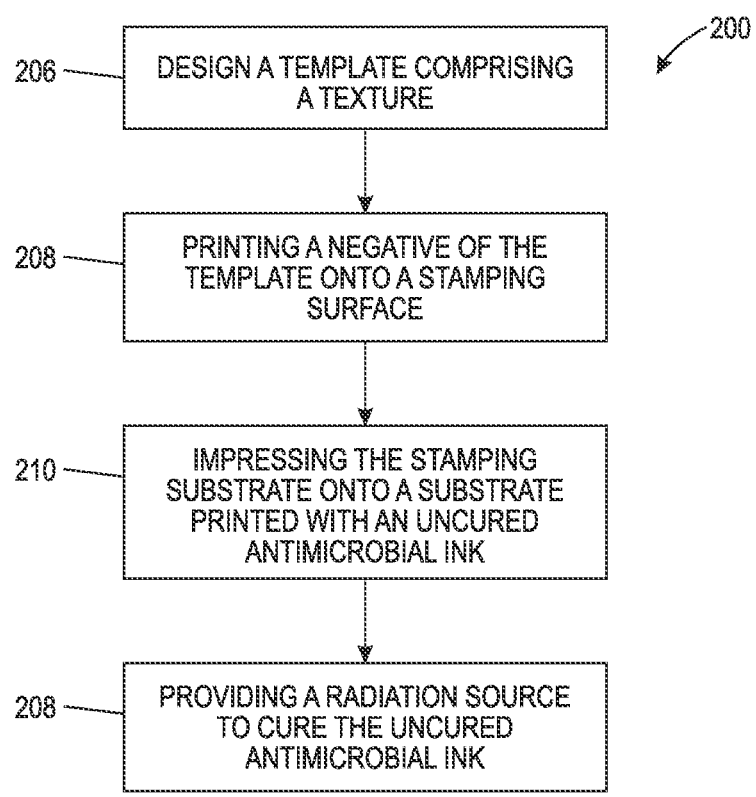
FIGS. 2A-2C are several flowcharts illustrating alternative methods to create printed textured surfaces with antimicrobial properties, according to embodiments.
Figure 2B:
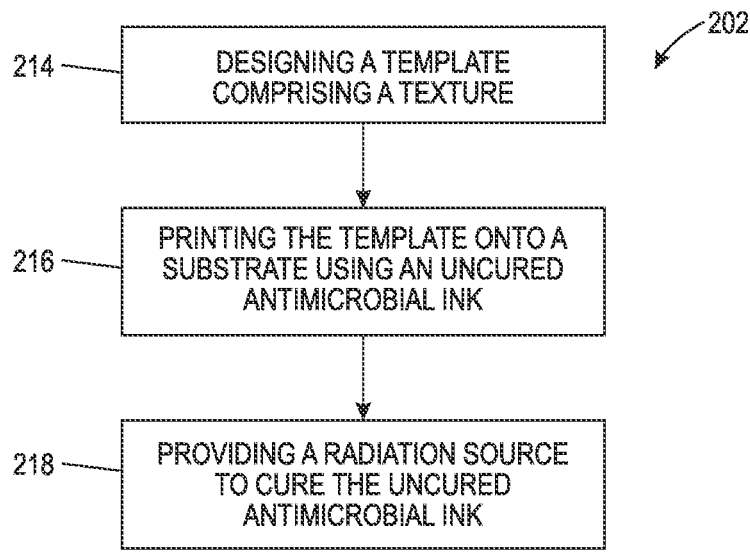
Figure 2C:
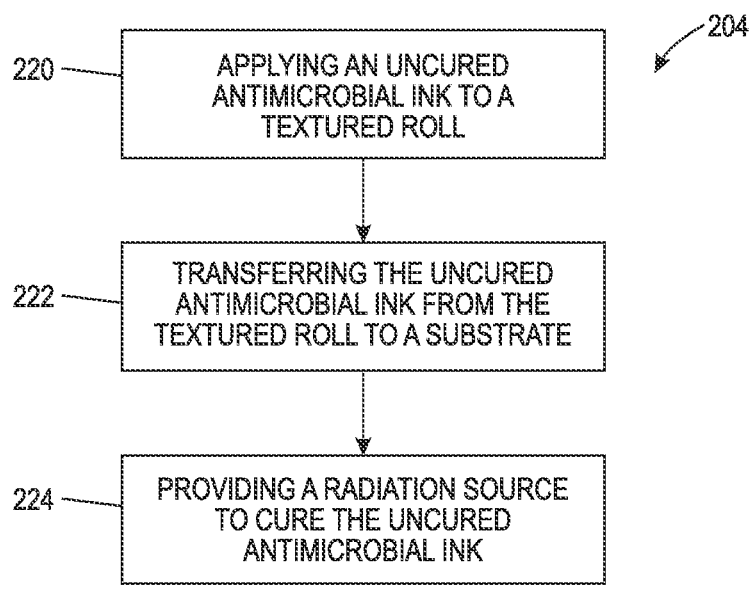

FIGS. 2A-2C are several flowcharts illustrating alternative methods to create printed textured surfaces with antimicrobial properties, according to embodiments. Shown in FIG. 2A is a method 200 of preparing a textured antimicrobial surface which includes designing a template comprising a texture 206, which may be done according to any digital computer aided design or physical method known to those skilled in the art. The printing of a negative of the template onto a stamping surface 208 is done next, which may be done onto a variety of suitable substrates, including silicone, polyurethane or other suitable media useful in transfer printing in such a manner. Then the stamping substrate is impressed onto a substrate which is pre-printed with an uncured antimicrobial ink 210, thus imparting a textured or engineered topographical surface to the inked surface as described herein. Finally, a light source or radiation source is provided to cure or crosslink the uncured antimicrobial ink 212 on the surface of the substrate. FIG. 2B illustrates a second process 202 of preparing a textured antimicrobial surface which includes designing a template comprising a texture 214 as described previously, printing the template directly onto a substrate using an uncured antimicrobial ink 216 and a suitable printing method as described herein. Finally, this method 202 includes a light source or radiation source provided to cure or crosslink the uncured antimicrobial ink 218 on the surface of the substrate. FIG. 2C illustrates a flowchart describing the process shown in greater detail in FIG. 1. This third process 204 of preparing a textured antimicrobial surface includes applying an uncured antimicrobial ink to a textured roll 220, transferring the uncured antimicrobial ink from the textured roll to a substrate 222 and finally providing a light source or radiation source provided to cure or crosslink the uncured antimicrobial ink 224 onto the surface of the substrate.

In alternate embodiments, alternate approaches for demonstrating nanostructured surface topographic patterning using curable antimicrobial phase change ink compositions may include direct printing of the antimicrobial ink compositions onto substrates or objects, creating a stamp onto a Mylar substrate via ink jet printing, spreading antimicrobial phase change ink compositions through a metal mask containing a specific arrangement and geometry of the nanostructures, or combinations thereof. Specific method embodiments may be selected depending on the substrate being treated, or printing equipment available. In other embodiments, additional light sources, including UV lasers may be prior to patterning to partially cure the ink before being transferred to the desired substrate. Additional method steps including the application of a release agent or release coating, such as a fluorocarbon based release coating or similar material, to a substrate to promote the release of a free-standing cured antimicrobial phase change ink composition may be used depending on the application or material to be treated.

EXAMPLES

The following Examples are being submitted to further define various species of the present disclosure. These Examples are intended to be illustrative only and are not intended to limit the scope of the present disclosure. Parts and percentages are by weight unless otherwise indicated.

A UV curable gellant ink may be used in inkjet-based or other raised print applications using a variety of application methods. These materials are comprised of radiation curable monomers and/or oligomers, a photoinitiator package, a reactive wax, and a gelator. The raised print material has robust jetting at elevated temperatures (10-15 cPs) and a degree of mechanical stability (105-106 cPs) at ambient substrate temperatures (i.e. room temperature). After printing, the markings are cured to provide robust structures. A typical formulation composition is disclosed below:

TABLE 1

Example raised print material

| Component | Weight % |
|---|---|
| Antimicrobial Additive (silver nanoparticles) | 0.05-2.0 |
| Curable Amide Gellant | 7.5 |
| Curable acrylate Wax | 5.0 |
| SR 399LV pentafunctional acrylate monomer | 5.0 |
| SR 9003 difunctional acrylate monomer | 72.5 |
| Photoinitiator | 9.5 |
| Irgastab UV Stabilizer | 0.4 |

Alternate embodiments of the formulation above may include metal ions, silver nanoparticles, biguanides, N-halamine molecules (e.g., 1-chloro-2,2,5,5-tetramethyl-4-imidazolidinone (MC)), and quaternary ammonium compounds (QACs), all of which are commonly used biocides for applications such as wound dressings, lotions and cleansers. Typical loadings of the biocides can range anywhere from 0.05% to 2% of the final UV-curable phase-change curable ink composition. Nanoparticles of interest that have shown excellent antimicrobial and biocidal activity to a wide range of both Gram positive and negative bacteria include copper oxide, silver, gold, zinc oxide, zinc pyrithione, calcium oxide, iron (III) oxide, titanium dioxide and magnesium oxide.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:
1. An antimicrobial coating, comprising:
a cured phase change ink comprising:
a crosslinked polymer;
a photoinitiator;

a wax;
a gellant; and
an antimicrobial additive; and
wherein a surface topography formed by the cured phase change ink comprises protruding features having a height from about 10 to about 5000 nm and spaced apart from one another by about 1 nm to about 5000 nm.

2. The antimicrobial coating of claim 1, wherein the crosslinked polymer further comprises one or more acrylate monomers in an amount of from about 4.0% to about 80.0% based on a total weight of the antimicrobial coating.

3. The antimicrobial coating of claim 2, wherein the one or more acrylate monomers is selected from a group consisting of difunctional acrylate monomers, trifunctional acrylate monomers, tetrafunctional acrylate monomer, and pentafunctional acrylate monomers, or combinations thereof.

4. The antimicrobial coating of claim 2, wherein the antimicrobial coating further comprises a pentafunctional acrylate monomer and a difunctional acrylate monomer.

5. The antimicrobial coating of claim 1, wherein the wax is present in an amount ranging from about 2.5% to about 15%, based on a total weight of the antimicrobial coating.

6. The antimicrobial coating of claim 1, wherein the gellant is present in an amount ranging from about 2.5% to about 15.0%, based on a total weight of the antimicrobial coating.

7. The antimicrobial coating of claim 1, wherein the gellant comprises a radiation curable gellant.

8. The antimicrobial coating of claim 1, wherein the antimicrobial additive is present in an amount ranging from about 0.01% to about 5.00%, based on a total weight of the antimicrobial coating.

9. The antimicrobial coating of claim 1, wherein the antimicrobial additive comprises metal nanoparticles, ionic-polymer metal composite nanoparticles, quaternary ammonium compounds, N-halamine molecules, biguanides, metal oxides, or combinations thereof.

10. The antimicrobial coating of claim 1, wherein the antimicrobial additive comprises silver nanoparticles.

11. The antimicrobial coating of claim 1, wherein the antimicrobial additive comprises a quaternary ammonium compound.

12. The antimicrobial coating of claim 1, wherein the surface topography has an engineered roughness index (ERI) of from about 5 to about 50; and wherein ERI is defined as:

$$ERI = r \times n/1 - \phi.$$

13. An antimicrobial coating, comprising:
a crosslinked polymer;
an antimicrobial additive; and
wherein a surface topography of the antimicrobial coating comprises protruding features having a height from about 10 to about 5000 nm and spaced apart from one another by about 1 nm to about 5000 nm.

14. The antimicrobial coating of claim 13, wherein the antimicrobial additive further comprises silver nanoparticles.

15. The antimicrobial coating of claim 13, wherein the antimicrobial additive further comprises a quaternary ammonium compound.

16. The antimicrobial coating of claim 13, wherein the surface topography has an engineered roughness index (ERI) of from about 5 to about 50; and wherein ERI is defined as:

$$ERI = r \times n/1 - \phi.$$

17. A method of preparing a textured antimicrobial surface, comprising:
designing a template comprising a texture;
printing the template onto a substrate using an uncured antimicrobial ink; and
providing a light source to crosslink the uncured antimicrobial ink; and
wherein the texture comprises protruding features having a height from about 10 to about 5000 nm and spaced apart from one another by about 1 nm to about 5000 nm.

* * * * *